(12) United States Patent
Ma et al.

(10) Patent No.: US 10,033,471 B2
(45) Date of Patent: Jul. 24, 2018

(54) WIRELESS CONNECTION PAIRING

(71) Applicant: Harman International Industries, Incorporated, Stamford, CT (US)

(72) Inventors: Jianjun Ma, Shanghai (CN); Zhaolong Kang, Shanghai (CN); Zeng Yang, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/037,147

(22) PCT Filed: Dec. 31, 2013

(86) PCT No.: PCT/CN2013/091114
§ 371 (c)(1),
(2) Date: May 17, 2016

(87) PCT Pub. No.: WO2015/100616
PCT Pub. Date: Jul. 9, 2015

(65) Prior Publication Data
US 2016/0294485 A1    Oct. 6, 2016

(51) Int. Cl.
*H04B 11/00* (2006.01)
*H04W 76/14* (2018.01)
(Continued)

(52) U.S. Cl.
CPC .......... *H04B 11/00* (2013.01); *H04W 4/008* (2013.01); *H04W 4/80* (2018.02); *H04W 12/06* (2013.01);
(Continued)

(58) Field of Classification Search
CPC .......................... H04B 11/00; H04R 2420/07
See application file for complete search history.

(56) References Cited

U.S. PATENT DOCUMENTS 9,191,252 B1 * 11/2015 Zarubica ............... H04W 12/00
9,398,623 B2 * 7/2016 Koezuka ................ H04B 11/00
(Continued)

FOREIGN PATENT DOCUMENTS

CN    202524563 U    11/2012
EP      2624616 A1    8/2013

OTHER PUBLICATIONS

ISA State Intellectual Property Office of the People's Republic of China, International Search Report and Written Opinion Issued in Application No. PCT/CN2013/091114, dated Oct. 14, 2014, WIPO, 13 pages.

(Continued)

*Primary Examiner* — Cindy Trandai
(74) *Attorney, Agent, or Firm* — McCoy Russell LLP

(57) ABSTRACT

A wireless connection pairing method and a first electronic device are provided. The method includes: broadcasting, through an audio system, an acoustic signal which carries pairing information for establishing wireless connection with a first electronic device; the first electronic device receiving from a second electronic device a request for establishing wireless connection with the first electronic device through a wireless network, where the request contains the pairing information extracted from the acoustic signal; and the first electronic device sending a notice of permission to the second electronic device. By employing the method, a mobile device can use connection service conveniently without inputting a password manually.

17 Claims, 3 Drawing Sheets

(51) Int. Cl.
*H04W 4/80* (2018.01)
*H04W 4/00* (2018.01)
*H04W 12/06* (2009.01)
H04W 76/10 (2018.01)
H04W 84/18 (2009.01)
H04W 76/02 (2009.01)
H04W 84/12 (2009.01)

(52) U.S. Cl.
CPC ......... *H04W 76/023* (2013.01); *H04W 76/14* (2018.02); *H04W 76/02* (2013.01); *H04W 76/10* (2018.02); *H04W 84/12* (2013.01); *H04W 84/18* (2013.01)

(56) References Cited

U.S. PATENT DOCUMENTS

| | | | | |
|---|---|---|---|---|
| 2006/0236091 A1* | 10/2006 | Kaji | ................ | H04L 29/06027 713/150 |
| 2008/0270528 A1* | 10/2008 | Girardeau | ............ | H04L 1/0007 709/203 |
| 2009/0060206 A1* | 3/2009 | Shiba | ................ | H04R 5/04 381/2 |
| 2009/0271318 A1* | 10/2009 | Grobler | ................ | G06Q 50/184 705/52 |
| 2010/0014095 A1* | 1/2010 | Patel | .................. | G08B 13/186 356/483 |
| 2010/0110837 A1* | 5/2010 | Jung | ..................... | H04B 11/00 367/137 |
| 2011/0074552 A1* | 3/2011 | Norair | .................. | G06K 7/0008 340/10.1 |
| 2012/0084131 A1* | 4/2012 | Bergel | ............. | G06F 17/30876 705/14.26 |
| 2012/0258669 A1* | 10/2012 | Honkanen | ................ | G01S 3/46 455/67.11 |
| 2013/0176984 A1 | 7/2013 | Koezuka | | |
| 2013/0204458 A1* | 8/2013 | Purushothaman | ....... | B60Q 5/00 701/1 |
| 2013/0308506 A1* | 11/2013 | Kim | ................... | H04W 76/023 370/310 |
| 2014/0059407 A1* | 2/2014 | Zopf | ................... | H03M 13/05 714/776 |
| 2014/0104990 A1* | 4/2014 | Shim | ..................... | H04B 11/00 367/197 |
| 2015/0296251 A1* | 10/2015 | Xu | ........................ | H04W 12/04 725/31 |

OTHER PUBLICATIONS

European Patent Office, Extended European Search Report Issued in Application No. 13900786.8, dated Jun. 27, 2017, Germany, 9 pages.

* cited by examiner

WIRELESS CONNECTION PAIRING

CROSS REFERENCE TO RELATED APPLICATIONS

The present application is a U.S. National Phase of International Patent Application Serial No. PCT/CN2013/091114, entitled "WIRELESS CONNECTION PAIRING," filed on Dec. 31, 2013, the entire contents of which are hereby incorporated by reference for all purposes.

TECHNICAL FIELD

The present disclosure generally relates to wireless connection pairing.

BACKGROUND

Nowadays, wireless connections, such as Wi-Fi and Bluetooth etc., are widely used to connect electronic devices to each other. Normally, to connect a first electronic device to a second electronic device using a wireless connection, a password is required, and it is inconvenient for a user to obtain and input the password manually. Therefore, there is a need for convenient methods for connecting an electronic device to another using a wireless connection.

SUMMARY

In one embodiment, a wireless connection pairing method is provided. The method may include: broadcasting, through an audio system, an acoustic signal which carries pairing information for establishing wireless connection with a first electronic device; the first electronic device receiving from a second electronic device a request for establishing wireless connection with the first electronic device through a wireless network, where the request contains the pairing information extracted from the acoustic signal; and the first electronic device sending a notice of permission to the second electronic device.

In some embodiments, the wireless connection pairing method may further include: the first electronic device establishing wireless connection with the second electronic device after the notice of permission is sent to the second electronic device.

In some embodiments, the wireless connection may be a Wi-Fi connection, and the pairing information may include: SSID (Service Set Identifier) of the first electronic device, an authorization type and a password. In some embodiments, the wireless connection may be a BT (Bluetooth) connection, and the pairing information may include: BT address, service class, UUID (Universally Unique Identifier) and device information of the first electronic device. Such that, a request for establishing Wi-Fi connection or BT connection with the first electronic device can be formed if the second electronic device receives the pairing information.

In some embodiments, the acoustic signal may be substantially inaudible, for example, its frequency may be above 19 KHz.

In some embodiments, the wireless connection pairing method may further include: the first electronic device encoding the pairing information; and modulating the encoded pairing information to form the acoustic signal.

In one embodiment, a wireless connection pairing method is provided. The method may include: a first electronic device receiving an acoustic signal which carries pairing information for establishing wireless connection with a second electronic device; extracting the pairing information from the received acoustic signal; sending to the second electronic device a request for establishing wireless connection with the second electronic device through a wireless network, where the request contains the extracted pairing information; and receiving a notice of permission from the second electronic device.

In some embodiments, the wireless connection pairing method may further include: establishing wireless connection with the second electronic device after the first electronic device receives the notice of permission from the second electronic device.

In some embodiments, the acoustic signal may be substantially inaudible, for example, its frequency may be above 19 KHz.

In some embodiments, the wireless connection pairing method may further include: demodulating the acoustic signal; and decoding the demodulated acoustic signal to obtain the pairing information.

In one embodiment, a method for broadcasting pairing information is provided. The method may include: a first electronic device obtaining pairing information used for establishing wireless connection with a second electronic device; processing the obtained pairing information to form an acoustic signal which carries the pairing information; and broadcasting the acoustic signal through an audio system.

In some embodiments, processing the obtained pairing information to form an acoustic signal may include: encoding the obtained pairing information; and modulating the encoded pairing information to form the acoustic signal.

In some embodiments, the wireless connection may be a Wi-Fi connection, and the pairing information may include: SSID of the second electronic device, an authorization type and a password. In some embodiments, the wireless connection may be a BT connection, and the pairing information may include: BT address, service class, UUID and device information of the second electronic device.

In some embodiments, the pairing information may be pre-stored in the first electronic device. In some embodiments, the pairing information may be input by a user.

In one embodiment, a first electronic device is provided. The first electronic device may include a speaker system, a wireless communication device and a processing device configured to: control the speaker system to broadcast an acoustic signal which carries pairing information for establishing wireless connection with the wireless communication device; and after the wireless communication device receives from a second electronic device a request for establishing wireless connection with the wireless communication device, control the wireless communication device to send a notice of permission to the second electronic device.

In some embodiments, the processing device may be further configured to control the wireless communication device to establish wireless connection with the second electronic device after the notice of permission is sent to the second electronic device.

In some embodiments, the wireless connection may be a Wi-Fi connection, and the pairing information may include: SSID of the wireless connection pairing system, an authorization type and a password. In some embodiments, the wireless connection may be a BT connection, and the pairing information may include: BT address, service class, UUID and device information of the wireless connection pairing system.

In some embodiments, the acoustic signal may be substantially inaudible, for example, its frequency may be above 19 KHz.

In some embodiments, the speaker system, the wireless communication device and the processing device may be separate devices/systems.

In some embodiments, the processing device may be further configured to: encode the pairing information; and modulate the encoded pairing information to form the acoustic signal.

In one embodiment, a first electronic device is provided. The first electronic device may include an acoustic signal receiving device, a wireless communication device and a processing device configured to: after the acoustic signal receiving device receives an acoustic signal which carries pairing information for establishing wireless connection with a second electronic device, extract the pairing information from the received acoustic signal; generate a request for establishing wireless connection with the second electronic device which request contains the pairing information extracted from the received acoustic signal; and control the wireless communication device to send the request to the second electronic device.

In some embodiments, the processing device may be further configured to control the wireless communication device to establish wireless connection with the second electronic device after the wireless communication device receives a notice of permission from the second electronic device.

In some embodiments, the acoustic signal may be substantially inaudible, for example, its frequency may be above 19 KHz.

In some embodiments, the processing device may be further configured to: demodulate the acoustic signal; and decode the demodulated acoustic signal to obtain the pairing information.

In one embodiment, a system for broadcasting pairing information is provided. The system may include an audio device and a processing device configured to: obtain pairing information used for establishing wireless connection with a first electronic device; process the pairing information to form an acoustic signal which carries the pairing information; and control the audio device to broadcast the acoustic signal.

In some embodiments, the processing device may be configured to: encode the pairing information; and modulate the encoded pairing information to form the acoustic signal.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
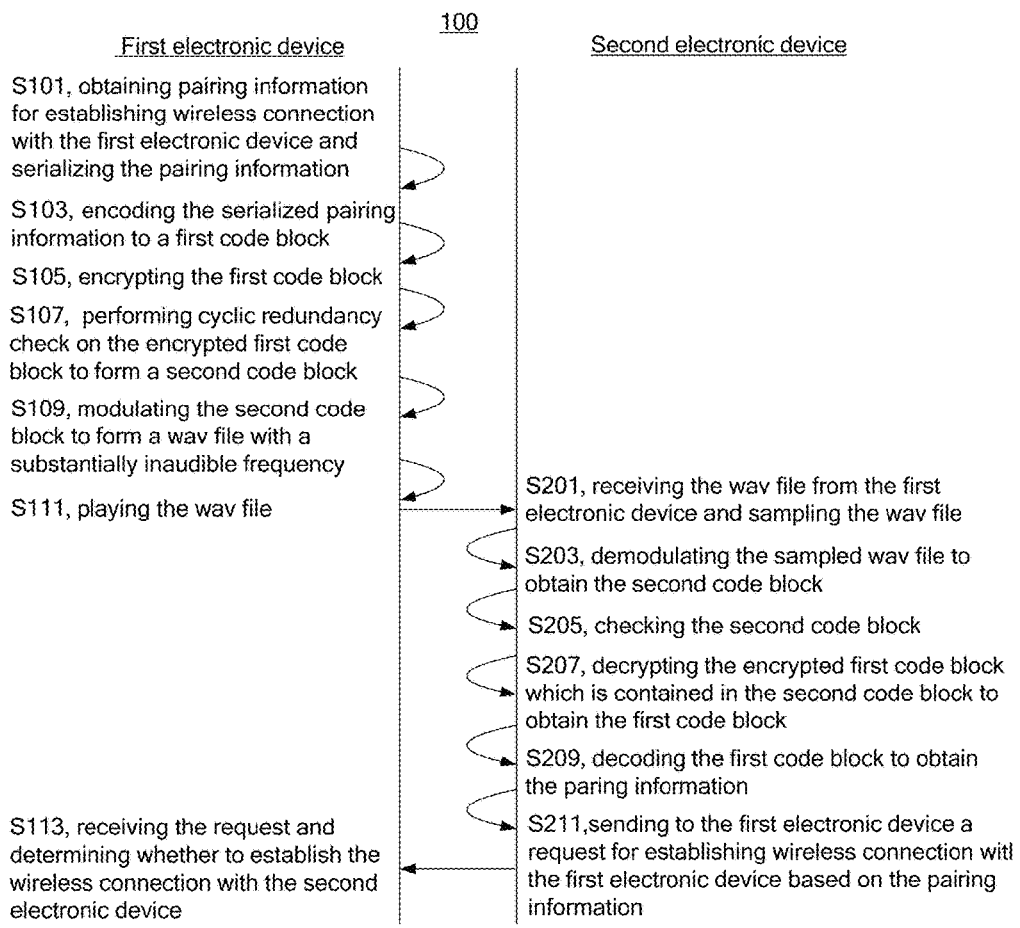
FIG. 1 schematically illustrates a flow chart of a wireless connection pairing method 100 according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

To establish a wireless connection between a server and a client, such as Wi-Fi connection or BT connection, it is necessary for the client to obtain pairing information and a pairing process is required.

FIG. 1 schematically illustrates a flow chart of a wireless connection pairing method 100 according to one embodiment. In the embodiment, Wi-Fi pairing is described as an example.

Referring to FIG. 1, in S101, a first electronic device obtaining pairing information for establishing wireless connection with the first electronic device and serializing the pairing information.

The first electronic device may include a Wi-Fi access point device which allows wireless devices to connect to a wireless network. In some embodiments, serializing the pairing information may be concatenating the pairing information into a string. In some embodiments, the pairing information may mainly include SSID (Service Set Identifier) of the first electronic device, an authorization type and a password. The authorization type may include WPA_PSK/WPA2_PSK (Wi-Fi Protected Access_Pre-Shared Key), WMM (Wi-Fi Multi Media), WPS (Wi-Fi Protected Setup) or the like.

In S103, the first electronic device encoding the serialized pairing information to a first code block.

In some embodiments, the serialized pairing information may be encoded according to ASCII (American Standard Code for Information Interchange) table to form a first code block.

In S105, the first electronic device encrypting the first code block.

In some embodiments, the first code block may be encrypted by a reversible encryption algorithm, such as symmetric-key algorithm including DES (Data Encryption Algorithm) algorithm, TDEA (Triple Data Encryption Algorithm) algorithm and RC5 algorithm. Besides, a keyt may be used in the encryption process. In some embodiments, S105 may not be performed.

In S107, the first electronic device performing CRC (Cyclic Redundancy Check) on the encrypted first code block to form a second code block.

In some embodiments, an error correcting code, which is calculated based on the encrypted first code block in a certain mathematical relation, may be added to the end of the encrypted first code block to form the second code block.

In S109, the first electronic device modulating the second code block to form a way file with a substantially inaudible frequency.

In some embodiments, the second code block may be encoded by a certain encoding method, such as a repeated encoding method, to form an encoded block. Then, a first modulation process, such as a PSK (Phase-Shift-Keying) modulation method, may be applied to the encoded block to form a set of symbols. A second modulation process, such as TDM (Time Division Multiplexing), FDM (Frequency Division Multiplexing) and CDM (Code Division Multiplexing), may be applied to the set of symbols to form a base band signal. Afterward, a carrier wave may be used to carry the base band signal to form a wave signal. In some embodiments, the carrier wave may have a substantially inaudible frequency, for example, above 19 KHz. Finally, a way file with the substantially inaudible frequency, which can be played by a speaker, may be constructed based on the wave signal.

In S111, the first electronic device playing the way file.

To play the way file, the first electronic device may have a speaker. In some embodiments, the way file may be played all the time. In some embodiments, the way file may be played under control. For example, if it is in a cafe, the first electronic device may play the way file all the time, such that customers' mobile devices can receive the way file any time. If it is at home, the first electronic device may be triggered to play the way file when a user wants to connect a mobile device to Wi-Fi.

In some embodiments, the way file may be played by a separate device, such as a separate audio system.

Figure 2:
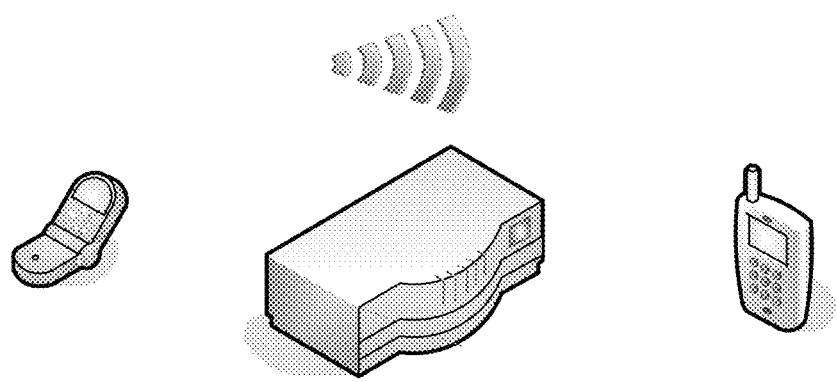
FIG. 2 schematically illustrates a diagram of a wireless network environment.

FIG. 2 schematically illustrates a diagram of a wireless network environment. As shown in FIG. 2, the first electronic device broadcasts an acoustic signal which has a substantially inaudible frequency, other devices with a microphone around may receive the acoustic signal.

In S201, a second electronic device receiving the way file from the first electronic device and sampling the way file.

In some embodiments, the second electronic device may be a mobile device which expects to connect to the first electronic device, such as a mobile phone. The second electronic device may have a microphone to receive the way file.

In some embodiments, the way file may be sampled by an A/D (Analog-to-Digital) converter with a sampling frequency of 48 KHz.

In S203, the second electronic device demodulating the sampled way file to obtain the second code block.

Since noise exists during the reception of the way file, in some embodiments, the way file may be put into a high pass filter in the second electronic device so that only a high frequency portion thereof remains.

Afterwards, a first and second demodulation processes, which respectively correspond to the second and first modulation processes in S109, may be employed to demodulate the way file to obtain the encoded block. And the encoded block may be decoded by a decoding method corresponding to the certain encoding method in S109 to obtain the second code block.

In S205, the second electronic device checking the second code block.

Specifically, since the second code block contains the encrypted first code block and the error correcting code, the second electronic device may determine whether the encrypted first code block is a correct code block. Specifically, the second electronic device may check whether the error correcting code and the encrypted first code block satisfy the certain mathematical relation described in S107. If yes, the encrypted first code block is determined to be a correct code block; vice versa. If the encrypted first code block is a correct code block, S207 may be performed; else, the second electronic device may wait for receiving a way file from the first electronic device again.

In S207, the second electronic device decrypting the encrypted first code block which is contained in the second code block to obtain the first code block.

In some embodiments, the second electronic device may employ the keyt which is used in the encryption process in S105 to decrypt the encrypted first code block.

In S209, the second electronic device decoding the first code block to obtain the pairing information.

In some embodiments, the first code block may be decoded according to ASCII table. After the decoding process, the second electronic device may obtain the pairing information, i.e., the SSID of the first electronic device, the authorization type and the password.

In S211, the second electronic device sending to the first electronic device a request for establishing wireless connection with the first electronic device based on the pairing information.

The process may be performed as a standard Wi-Fi pairing process. In the embodiment, a connection process with an authorization type of WPA_PSK is described. After obtaining the pairing information, the second electronic device may generate a first set of information based on the pairing information and send the first set of information to the first electronic device. The first set of information may include PSK (Pre-Shared Key), a first random number and a MAC (Message Authentication Code). The first electronic device may generate a second random number and send it to the second electronic device. The second electronic device generates a first MIC (Message Integrity Check) based on the second random number and the first set of information, and sends the first MIC to the first electronic device.

In S113, the first electronic device receiving the request and determining whether to establish wireless connection with the second electronic device.

In some embodiments, the first electronic device may calculate a second MIC. And after receiving the first MIC from the second electronic device, the first electronic device may determine whether the first MIC is corresponding to the second MIC. If yes, the first electronic device may send a notice of permission to the second electronic device and connect with the second electronic device; vice versa.

Hereafter, a BT (Bluetooth) pairing process is described as an example. A first BT device serializes pairing information which includes BT address, service class, UUID (Universally Unique Identifier) and device information of the first BT device. Then, the first BT device may perform encoding, encryption and modulation on the serialized pairing information in turn to form a way file with a substantially inaudible frequency. Afterward, the first BT device plays the way file. A second BT device, once receiving the way file, may perform demodulation, decryption and decoding on the way file to obtain the pairing information. Afterward, the second BT device uses the pairing information to connect to the first BT device following SSP (Secure Simple Pairing).

By employing the above pairing methods, a mobile device may perform Wi-Fi connection or BT connection without searching hotspot and inputting password manually, which is more convenient for users. Further, since the pairing information for establishing wireless connection with a central device is broadcasted by the central device or any other audio system through an acoustic signal, devices around the central device or the any other audio system may receive the pairing information while other devices can not receive the pairing information, which ensures a safe usage of wireless connection. Besides, the acoustic signal is substantially inaudible, which avoids influence to persons.

Figure 3:
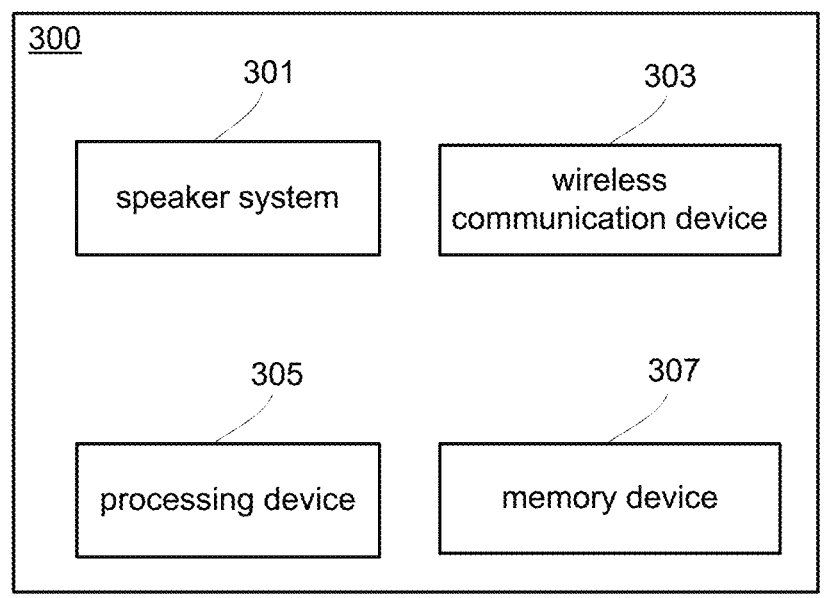
FIG. 3 illustrates a schematic block diagram of a first electronic device 300 according to one embodiment.
Figure 4:
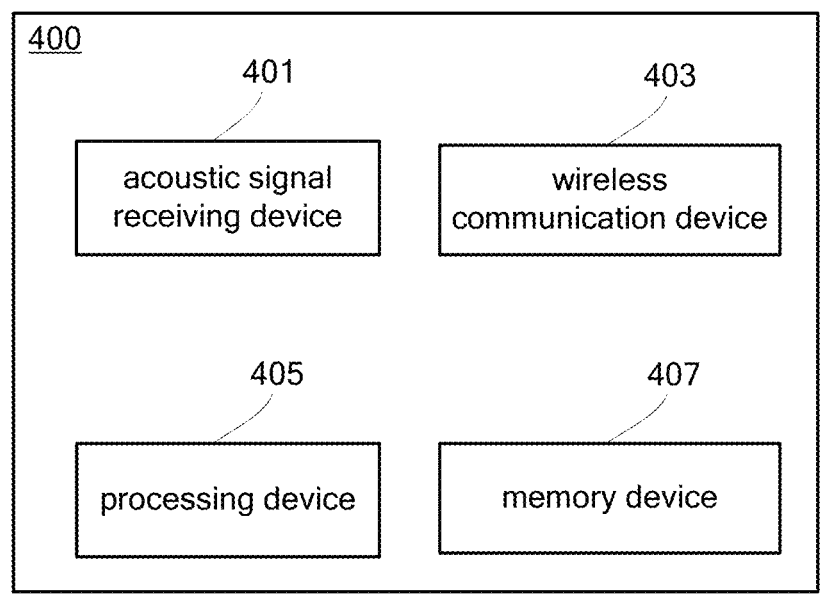
FIG. 4 illustrates a schematic block diagram of a second electronic device 400 according to one embodiment.

FIG. 3 illustrates a schematic block diagram of a first electronic device 300 according to one embodiment and FIG. 4 illustrates a schematic block diagram of a second electronic device 400 according to one embodiment.

In some embodiments, the first electronic device 300 may be a Wi-Fi access point device or a BT enabled device. The second electronic device 400 may be a mobile device which expects to establish wireless connection with the first electronic device 300.

Referring to FIGS. 3 and 4, the first electronic device 300 may include a speaker system 301, a wireless communication device 303, a processing device 305 and a memory device 307.

The processing device 305 may be configured to: obtain pairing information, wherein the pairing information is used to establish wireless connection with the wireless communication device 303 and may include SSID of the wireless communication device 303, an authorization type and a password; serialize the pairing information; encode the serialized pairing information to a first code block; encrypt the first code block; modulate the encrypted first code block to form a way file with a substantially inaudible frequency; control the speaker system 301 to play the way file; and after the wireless communication device 303 receives from the second electronic device 400 a request for establishing wireless connection with the first electronic device 300, determine whether to establish wireless connection with the second electronic device 400, where the request is formed based on the way file. In some embodiments, the processing device 305 may be a CPU, or a MCU, or a DSP etc., or any combination thereof. The memory device 307 may store an operating system and program instructions. In some embodiments, the speaker system 301, the wireless communication device 303 and the processing device 305 may be separate devices/systems.

The second electronic device 400 may include an acoustic signal receiving device 401, a wireless communication device 403, a processing device 405 and a memory device 407. In some embodiments, the acoustic signal receiving device 401 may be a microphone.

The processing device 405 may be configured to: after the acoustic signal receiving device 401 receives the way file from the first electronic device 300, sample the way file; demodulate the sampled way file to obtain the encrypted first code block; decrypt the encrypted first code block to obtain the first code block; decode the first code block to obtain the pairing information; generate the request for establishing wireless connection with the first electronic device 300 based on processing the pairing information; control the wireless communication device 403 to send the request to the first electronic device 300, such that the first electronic device 300 determines whether to establish wireless connection with the second electronic device 400 based on the request.

In some embodiments, the processing device 405 may be a CPU, or a MCU, or a DSP etc., or any combination thereof. The memory device 407 may store an operating system and program instructions. In some embodiments, the acoustic signal receiving device 401, the wireless communication device 403 and the processing device 405 may be separate devices/systems.

According to one embodiment, a non-transitory computer readable medium, which contains a computer program for wireless connection pairing, is provided. When the computer program is executed by a processor, it will instruct the processor to: broadcast, through an audio system, an acoustic signal which carries pairing information for establishing wireless connection with a first electronic device; receive from a second electronic device a request for establishing wireless connection with the first electronic device through a wireless network, where the request contains the pairing information extracted from the acoustic signal; and send a notice of permission to the second electronic device.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for broadcasting pairing information, the method comprising:
   obtaining, with a first electronic device, pairing information used for establishing wireless connection with the first electronic device;
   processing the obtained pairing information to form an acoustic signal which carries the pairing information;
   broadcasting the acoustic signal through an audio system; and
   receiving, with the first electronic device from a second electronic device, a request for establishing wireless connection with the first electronic device through a wireless network, where the request comprises the pairing information as extracted from the acoustic signal;
   wherein processing the obtained pairing information comprises serializing the pairing information by concatenating the pairing information into a string, encoding, with the first electronic device, the string to form a first code block, performing a cyclic redundancy check on the first code block to form a second code block, and modulating the second code block to form the acoustic signal with a substantially inaudible frequency.

2. The method according to claim 1, wherein the acoustic signal is substantially inaudible.

3. The method of claim 1, further comprising sending, with the first electronic device, a notice of permission to the second electronic device.

4. The method of claim 3, further comprising the first electronic device establishing wireless connection with the second electronic device after the notice of permission is sent to the second electronic device.

5. A first electronic device, comprising a speaker system, a wireless communication device, and a processing device, configured to:
   modulate data associated with pairing information to form an audio file with a substantially inaudible frequency;
   control the speaker system to broadcast a substantially inaudible acoustic signal corresponding to the audio file which carries the pairing information for establishing wireless connection with the wireless communication device; and after the wireless communication device receives from a second electronic device a request for establishing wireless connection with the wireless communication device, control the wireless communication device to send a notice of permission to the second electronic device, wherein the request comprises the pairing information as extracted from the substantially inaudible acoustic signal.

6. The first electronic device according to claim 5, wherein the processing device is further configured to control the wireless communication device to establish wireless connection with the second electronic device after the notice of permission is sent to the second electronic device.

7. The first electronic device according to claim 5, wherein the processing device is further configured to:
encode the pairing information; and
modulate the encoded pairing information to form the acoustic signal.

8. The first electronic device of claim 5, wherein the processing device is further configured to encode the pairing information to a first code block and encrypt the first code block.

9. The first electronic device of claim 8, wherein the processing device is further configured to perform a cyclic redundancy check on the first code block to form a second code block.

10. The first electronic device of claim 9, wherein the processing device is further configured to modulate the second code block to form the substantially inaudible acoustic signal.

11. A first electronic device, comprising an acoustic signal receiving device, a wireless communication device, and a processing device, configured to:
after the acoustic signal receiving device receives an acoustic signal which carries pairing information for establishing wireless connection with a second electronic device, demodulate the acoustic signal and extract the pairing information from the received acoustic signal, the acoustic signal being formed by modulating data associated with the pairing information to form an audio file with a substantially inaudible frequency;
generate a request for establishing wireless connection with the second electronic device, wherein the request contains the pairing information extracted from the received acoustic signal; and
control the wireless communication device to send the request to the second electronic device.

12. The first electronic device according to claim 11, wherein the processing device is further configured to control the wireless communication device to establish wireless connection with the second electronic device after the wireless communication device receives a notice of permission from the second electronic device.

13. The first electronic device according to claim 11, wherein the acoustic signal is substantially inaudible.

14. The first electronic device according to claim 11, wherein the processing device is further configured to:
demodulate the acoustic signal; and
decode the demodulated acoustic signal to obtain the pairing information.

15. The first electronic device of claim 14, wherein the processing device is configured to demodulate the acoustic signal to obtain a code block encoded by the second electronic device.

16. The first electronic device of claim 15, wherein the processing device is configured to perform a cyclic redundancy check on the code block.

17. The first electronic device of claim 15, wherein the code block is a first code block and wherein the processing device is configured to decrypt the first code block to obtain a second code block encoded by the second electronic device.

* * * * *